Feb. 9, 1971   H. C. REYNOLDS   3,561,260
METHOD OF MEASURING TENSION IN A FASTENER
Filed May 6, 1969          12 Sheets-Sheet 1

INVENTOR.
HAROLD C. REYNOLDS

INVENTOR.
HAROLD C. REYNOLDS

United States Patent Office 3,561,260
Patented Feb. 9, 1971

3,561,260
METHOD OF MEASURING TENSION IN A FASTENER
Harold C. Reynolds, Athens, Pa., assignor to Cooper Industries, Inc., a corporation of Ohio
Filed May 6, 1969, Ser. No. 822,261
Int. Cl. G01l 5/00
U.S. Cl. 73—88
9 Claims

ABSTRACT OF THE DISCLOSURE

An apparatus and method for measuring tension in a threaded fastener such as a bolt. Tension is measured by detecting the deflection of the integrally formed top surface of the bolt in the direction of the axis of the bolt shank, between a first reference surface on the axis of the shank and a second reference surface radially removed from the axis. Pneumatic, electrical and mechanical methods and apparatus for sensing and measuring the tension in the fastener as a function of the movement of the central reference surface relative to the peripheral reference surface, are disclosed. Also disclosed is a servomechanism in combination with the apparatus for sensing the tension in the fastener which acts to initiate a secondary operation such as shutting off a motive power mechanism driving the fastener when a predetermined tension has been reached.

---

The fastener industry has concerned itself with the problem of the correct amount of clamping force holding two members together by a fastener, such as a bolt. If the stress level is not sufficient, then fluctuations in loading may result in failure.

The prior art has attempted to control this stress level by relating it to torque applied to the bolt. This method is not particularly reliable because the stress level may vary greatly under the same torque applied. The factors greatly affecting torque are friction between the male and female threads and friction on the bearing face. Another method used is that involving washers which yield at different force loads and another system uses plastic materials which are squeezed from the fastener when various loads are applied thereto. The art has also used what has commonly been referred to as the "turn of the nut" method, however, the difficulty involved with this method is the uncertainty as to when to start measuring or counting the turns. Still another method involves the use of a pin which extends axially into the bolt through an opening and is attached to the bolt only at the bottom of the opening. The other end of the pin occupies some relationship with the head of the bolt, for example flush therewith, under an unloaded condition of the bolt. As the bolt is loaded axially it elongates, however, the pin does not because it does not carry a load and as a result the other end of the pin occupies a different relationship with the head of the bolt under loaded condition. The different relationship is a measurement of the elongation of the bolt which is a function of the tension. These devices are comparatively complicated and expensive to produce.

The present invention concerns itself with the discovery that a fastener such as a threaded bolt, designed as disclosed herein, will have a head integrally connected to a shank and which has first and second reference surfaces whose relationship changes as tension is applied to the bolt. The head undergoes deformation as the bolt is tensioned and the reference surfaces change position.

The change in position of the reference surface is measured by means of the change acting as a valve (varying the size of a gas orifice) which controls the flow rate of a fluid such as air which may be directly related to the tension in the fastener. The change in position of the reference surfaces may also serve to vary the reluctance in a magnetic circuit which can be directly related to the tension in the fastener. The change in position can also be mechanically measured.

In addition, the present invention has disclosed circuitry, (specifically pneumatic in nature, however, electrical circuitry would be analogous) for initiating a secondary operation such as shutting off, slowing down or reversing a motive power means used to tighten the fastener, upon the reaching of a predetermined tension in the fastener.

The present invention is important, in addition to the reasons given above in that it enables the industry to:
(a) Install a fastener to an accurate tension;
(b) Record this data relating to tension in the fastener; and
(c) Recheck the fastener tension at a later date to determine if the tension still meets a given standard.

Other objects and a fuller understanding of this invention may be had by referring to the following description and claims, taken in conjunction with the accompanying drawing, in which:

FIGS. 15, 16 and 17 are graphs which help describe the means of measuring the tension in the bolt as shown in FIGS. 6 and 7. The curve shown in FIG. 15 is a graph showing the deflection (S) of the head and the pressure downstream of the fixed orifice in inches of mercury.

Figure 1:
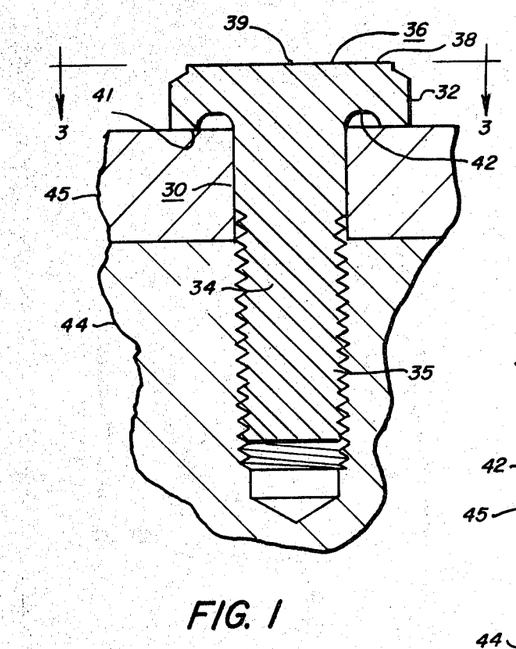
FIG. 1 is a side elevational view in section of a bolt constructed in accordance with the teachings of the present invention and holding two metal members together and in this view the bolt is shown in an untensioned condition.
Figure 2:
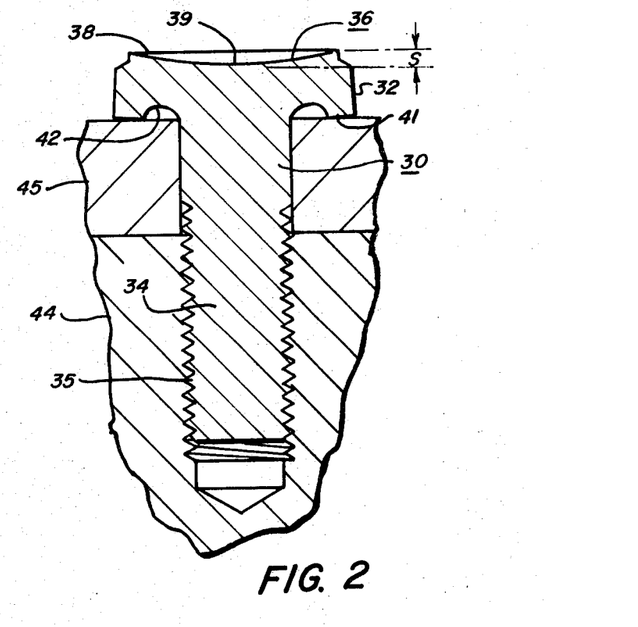
FIG. 2 is a view similar to FIG. 1 but showing the bolt in a tensioned condition with the deflection of the head exaggerated for better understanding.
Figure 3:
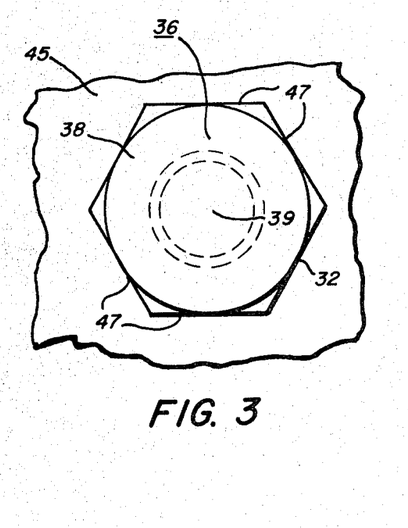
FIG. 3 is a view taken generally along the line 3—3 of FIG. 1.

Referring specifically to FIGS. 1, 2 and 3, there is shown the threaded member 30 of the present invention which is constructed in the form of a bolt and this bolt, in accordance with the teachings of the present invention, is capable of having the tension therein conveniently measured. The bolt comprises a head 32 which is integrally connected to a shank 34 which is provided with threads 35 thereon. The head 32 has what will be referred to as a top surface 36 which includes an outer peripheral surface 38 and a central surface 39. In accordance with the teachings of the present invention these two surfaces 38 and 39 each occupy a given position with respect to each other and in this particular embodiment they both lie in the same plane in the untensioned condition of the bolt. The condition of the bolt as shown in FIG. 1 is the untensioned position of bolt. The head 32 is also provided with a bearing surface 41. The bearing surface 41 is provided with wall means which serve to define a groove 42 which extends around and is located adjacent the shank 34. As seen in FIGS. 1, 2 and 3, the bolt 30 has been utilized for holding a plate 45 to a body member 44. In this respect, the bolt extends through an opening in the plate 45, and into a threaded opening in the body member 44. As noted in FIG. 3, the bolt is provided with conventional flats 47 which are adapted to be engaged by a wrench or suitable socket device to tighten or loosen the bolt 30. It will be seen from viewing of FIG. 1 that the groove 42 provides clearance between the top of the plate 45 and the bearing surface 41 of the head 32. The design of the bolt of the invention must be such that the change in position of the central surface 39 with respect to the outer peripheral surface 38 can be measured in accordance with the teachings as hereinafter set forth and so that this measured amount can be directly related to the tension in the bolt. In the preferred embodiment described herein, the ratio of the diameter of the groove 42 over the axial distance from the bottom of the groove to the top surface 36 is preferably in the range of from 2.5 to 1 to 5.5 to 1.

Referring specifically to FIG. 2, it will be seen that this figure shows the bolt 30 of FIG. 1 turned down with the screw threads on the shank thereof mating with the threads of the body member 44 so as to produce tension in the bolt. FIG. 2 has been somewhat exaggerated so as to illustrate the effect which takes place upon tensioning of the bolt. It will be seen as the bolt is tensioned, that the surface 36 deflects and the central surface 39 is caused to move axially with respect to the outer peripheral surface 38. It is the change in position of the central surface 39 with respect to the outer peripheral surface 38 that is a measure of the tension in the bolt and in this respect attention is invited to FIG. 16 which is a graph showing the relationship of this distance identified by the letter S which is shown on the X axis to the tension which is in the bolt which is shown on the Y axis. In accordance with the teachings of the present invention, it is necessary that the surface 39, centrally located on the head, occupy a precise axial relationship to the outer peripheral surface 38 when the bolt is in its initial, unstressed condition. In the embodiment shown in FIGS. 1 and 2 these two surfaces are located in the same plane. In this respect it is important in accordance with this invention that the two reference surfaces be accurately located (before tensioning) with respect to each other so that an accurate determination can be made of the amount of deflection (after tensioning) so that an accurate measure of the tension can be had.

It is generally desirable in accordance with this invention that two reference surfaces be located accurately approximately within at least .0001 inch of each other.

It should be noted by those skilled in the art that it is not necessary that the central surface 39 and he outer peripheral surface 38 lie in the same plane in the untensioned condition of the bolt but it is only necessary that they occupy a given and preselected position with respect to each other. Attention is invited to FIG. 20 of the drawings in his paricular respect which shows the central surface axially displaced closer to the threaded shank in the untensioned condition of the bolt than the outer peripheral surface. This embodiment will be discussed in more detail hereinafter. The same principle is followed if a "crown effect" is given to the fastener, namely that of axially displacing the central surface further from the shank than the peripheral surface. The teachings of the present invention, however, are still followed in these respects because it is the difference between the positions in the untensioned condition as compared to the tensioned condition that is a measure and is a function of the tension in the bolt.

Figure 4:
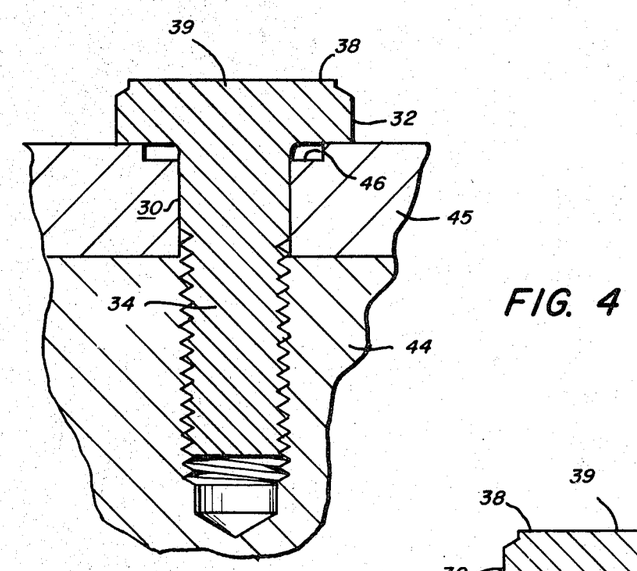
FIG. 4 shows a modified form of the invention which omits the groove on the bearing surface of the head and accomplishes the function of the groove by means of a counterbore in the top metal member.
Figure 5:
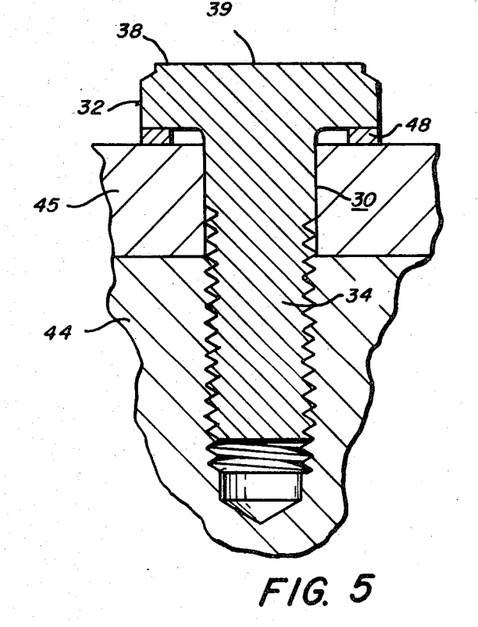
FIG. 5 shows a still further modified form of the invention wherein the function of the groove or the counterbore are accomplished by means of a washer with an enlarged opening therein.

FIGS. 4 and 5 illustrate variations in the construction shown in FIGS. 1 and 2. In FIG. 4 the groove 42 has been eliminated and the function of the groove has been replaced by a counterbore 46 in the plate 45. The outer peripheral portion of the bearing surface engages the top surface of plate 45 and the inner portion of the bearing surface is in effect an "unsupported surface" which permits deflection of the head when tension is applied to the bolt.

The construction of FIG. 5 also eliminates the groove 42 in the bearing surface of the bolt head as well as the counterbore 46 in the plate 45. The counterbore 46 is replaced by a separate washer 48 which flatly engages the top surface of plate 45 and has an enlarged opening therein to support the outer periphery of the bearing surface of the fastener head and leave the inner periphery thereof "unsupported." The same reference numerals have been applied to these figures as in FIGS. 1 through 3, where possible.

Figure 6:
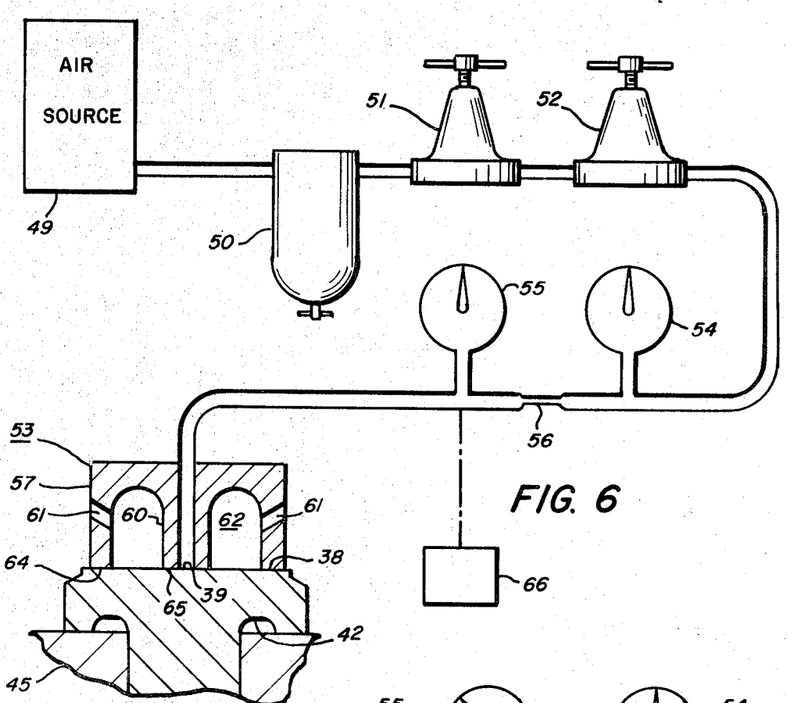
FIG. 6 is a schematic view of a pneumatic measuring means for measuring the tension in the bolt shown in FIG. 1.
Figure 7:
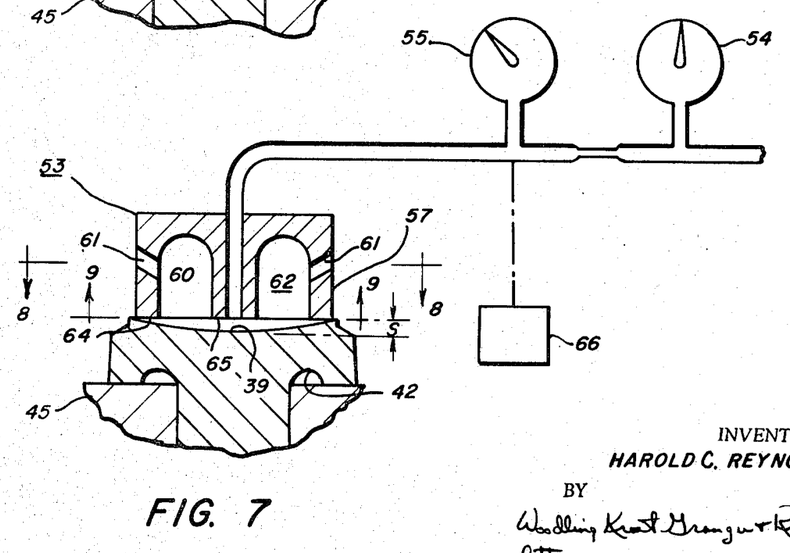
FIG. 7 is a view similar to FIG. 6 but showing the pneumatic measuring means as measuring the tension in the bolt of FIG. 2 when the bolt is under tension.

The gas pressure measuring means hereinabove referred to is shown in FIGS. 6 and 7 and as will be seen includes an air pressure source 49 shown only schematically and a conduit leading from the pressure source 49 transports air under pressure to a filter 50 which simply serves to filter out foreign material. The pressure source can be any commercial source of pressurized air such as that found in most commercial establishments and might vary from 90 to 130 pounds per square inch. The filtered air from filter 50 passes through a first pressure reducer or regulator 51 which serves to reduce the air pressure from the source 49 down to a predetermined pressure, for example 5 pounds per square inch, and for the sake of illustration only, one might say accurately reduces the air pressure down to a predetermined amount somewhere between two and twenty pounds per square inch. The air is then directed through a second pressure regulator 52 where it is reduced to a pressure in the general range of from ¼ to 3 pounds per square inch and in this specific description it is reduced to 1½ pounds per square inch. The air is next directed through a fixed orifice 56 and from there it is transmitted to a measuring head 53. The measuring head includes an annular wall 57 and a central wall 60, both of which serve to define an annular chamber 62. Both the annular wall 57 and the central wall 60 have cooperating flat end surfaces 64 and 65 respectively which in the untensioned condition of the bolt 30 engage in a flush manner with the outer peripheral surface 38 and the central surface 39. It will be seen that the interface between the central surface 39 and the end surface 65 of the central wall 60 acts in effect as a valve as the threaded member goes from an untensioned condition in which it is shown in FIG. 6 to a tensioned condition which is shown in FIG. 7. As this valve is opened, air under pressure is caused to flow into the chamber 62 and from the chamber 62 it passes to atomsphere through a plurality of openings 61 which are provided in the annular wall 57. Pressure measuring means 54 and 55 are provided in the conduit on the upstream and downstream sides respectively of the fixed orifice 56 and serve to monitor the pressure at these two points under flow conditions when the valve 39, 65 hereinabove discussed is in an open condition so as to cause flow of air under pressure.

The form and shape of the measuring head may vary substantially, however, it is necessary to have at least three angularly spaced points of contact at the outer peripheral surface 38 to prevent tilting of the head during measuring. The continuous annular wall 57 constitutes an infinite number of spaced points since it engages the outer peripheral surface throughout 360 degrees. It is also necessary that the points of contact be accurately located with respect to the surface 65 on central wall 60.

Figures 8, 16:
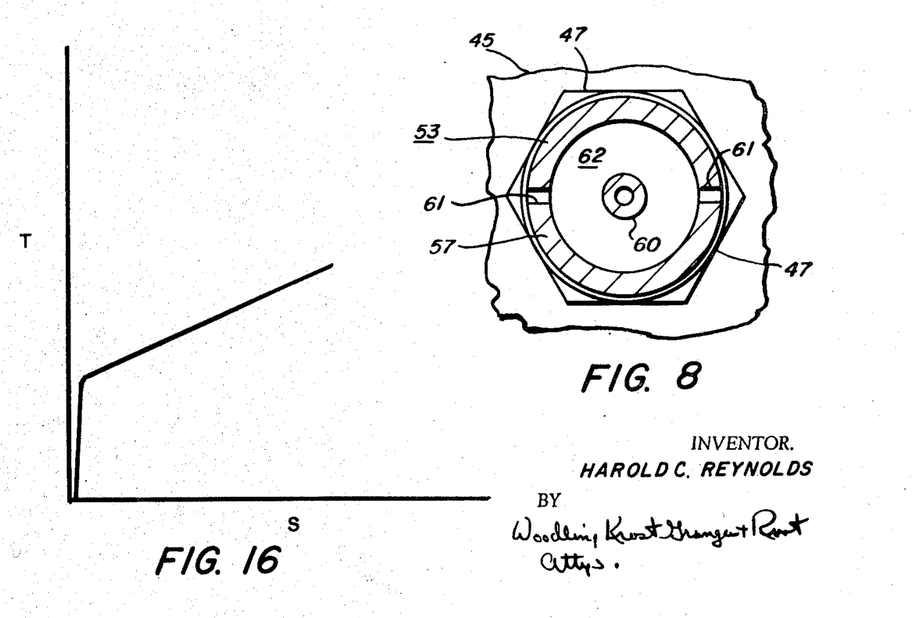
FIG. 8 is a view taken generally along the line 8—8 of FIG. 7.
FIG. 16 is a graph showing the relationship of the deflection (S) in the head of the threaded member with respect to tension (T) therein.
Figure 9:
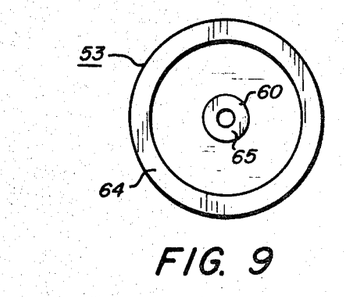
FIG. 9 is a view taken generally along the line 9—9 of FIG. 7.
Figure 15:
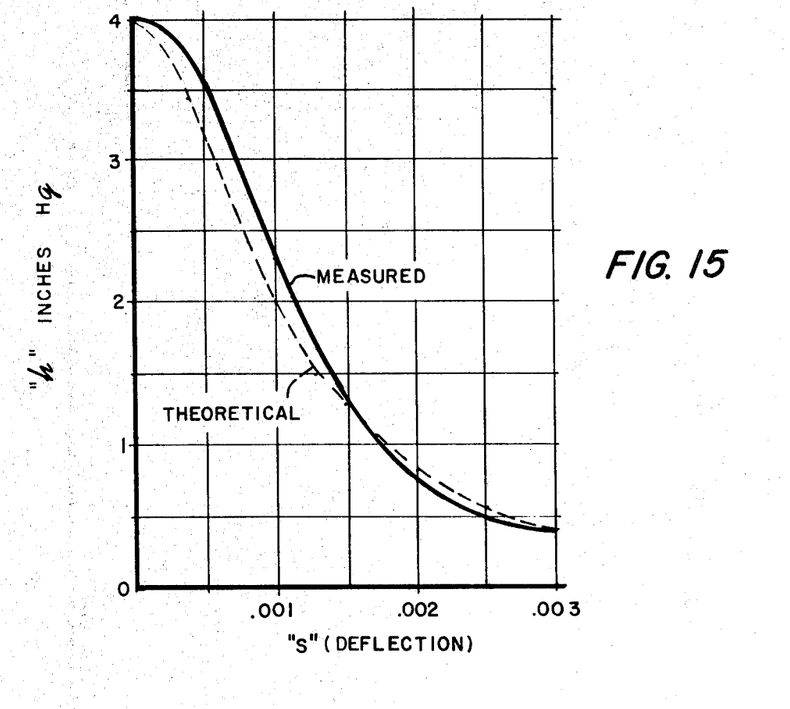

The relationship of tension in the threaded member with respect to deflection S is shown in FIG. 16. S is proportional to the opening through which gas flows. The relationship of flow through the system shown in FIGS. 6 and 7 is best expressed or shown in FIG. 15 which is a curve showing the deflection S at the interface between the surface 65 and the central surface 39 and the pressure on the downstream side of the fixed orifice 56 as measured by the pressure gauge 55 and expressed as inches of mercury. In this particular graph there is shown both the computed or theoretical curve and the measured or actual curve. It will be apparent to those skilled in the art that in the valve 39, 65 the area is proportional to the clearance between surface 39 and surface 65. This clearance or deflection of the head S is theoretically proportional to the tension in the bolt (FIG. 16). The difference between the theoretical and measured curves in FIG. 15 is probably due to the fact that the fixed orifice 56 is circular (or other fixed shape) and the valve 39, 65 is cylindrical and the flow patterns are slightly different due to capillary flow.

Figure 17:
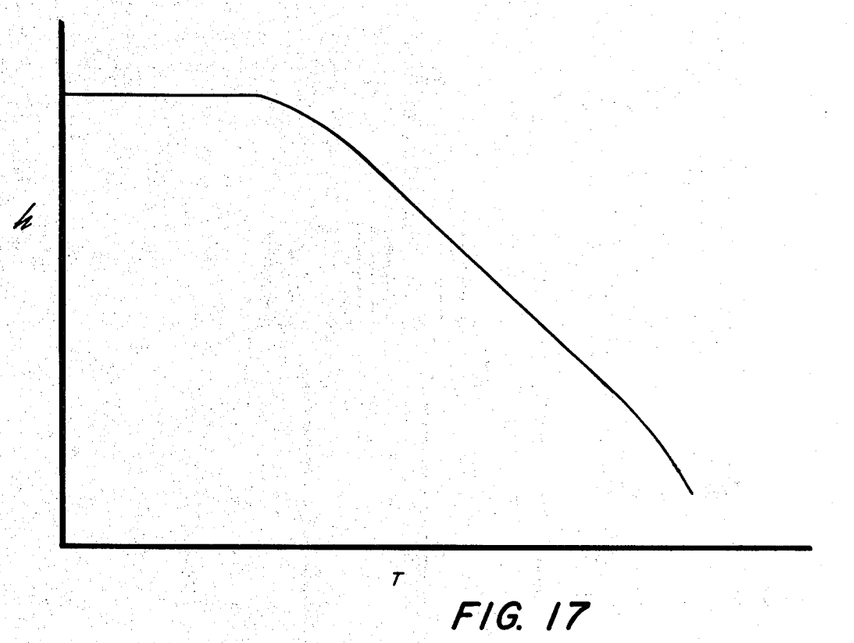
FIG. 17 is a curve showing the relationship between the tension (T) in the threaded member as compared to the pressure downstream of the fixed orifice as measured in inches of mercury.

FIG. 17 is a graph showing the relationship of tension in the threaded member and the pressure ($h$) on the downstream side of the fixed orifice 56 as measured by gauge 55 and expressed as inches of mercury. The air flow through the orifices 56 and 65 follows a formula and that formula is as follows:

$$h = \frac{H}{1 + \frac{S^2}{G^2}}$$

wherein $h$ is the pressure on the downstream side of the fixed orifice 56 measured by gauge 55 and expressed in inches of mercury. H is the pressure upstream of the fixed orifice 56 as measured by gauge 54 and also expressed in inches of mercury. S is the size (in square inches) of the valve 39, 65, wherein G is the size of fixed orifice 56 (in square inches). Since S is proportional to the clearance between 39 and 65 it may be considered as a single dimension measurement. It will be clearly apparent therefore that if the pressure on the upstream side of the fixed orifice is known as well as the size of the fixed orifice G, then for any given value of $h$, the value of S can be determined. These relationships are set forth in the curves of FIGS. 15, 16 and 17.

It will be quite clear from the above that once the calibrations and relationshpis as set forth in FIGS. 15, 16 and 17 have been determined, a reading of the pressure under tensioned conditions of the bolt as measured on gauge 55 can be directly translated to a given tension in the threaded member. This can be done simply by making the indications on the gauge 55 read in terms of tension in the threaded member as distinguished from pressure. A recording device 66 has been shown in FIGS. 6 and 7 and is for the purpose of demonstrating that the tension in any given fastener can be recorded for future reference such as rechecking at a later date. The device 66 might also be used as an audio or visual alarm to indicate the reaching of a desired tension.

Figures 10, 11, 12:
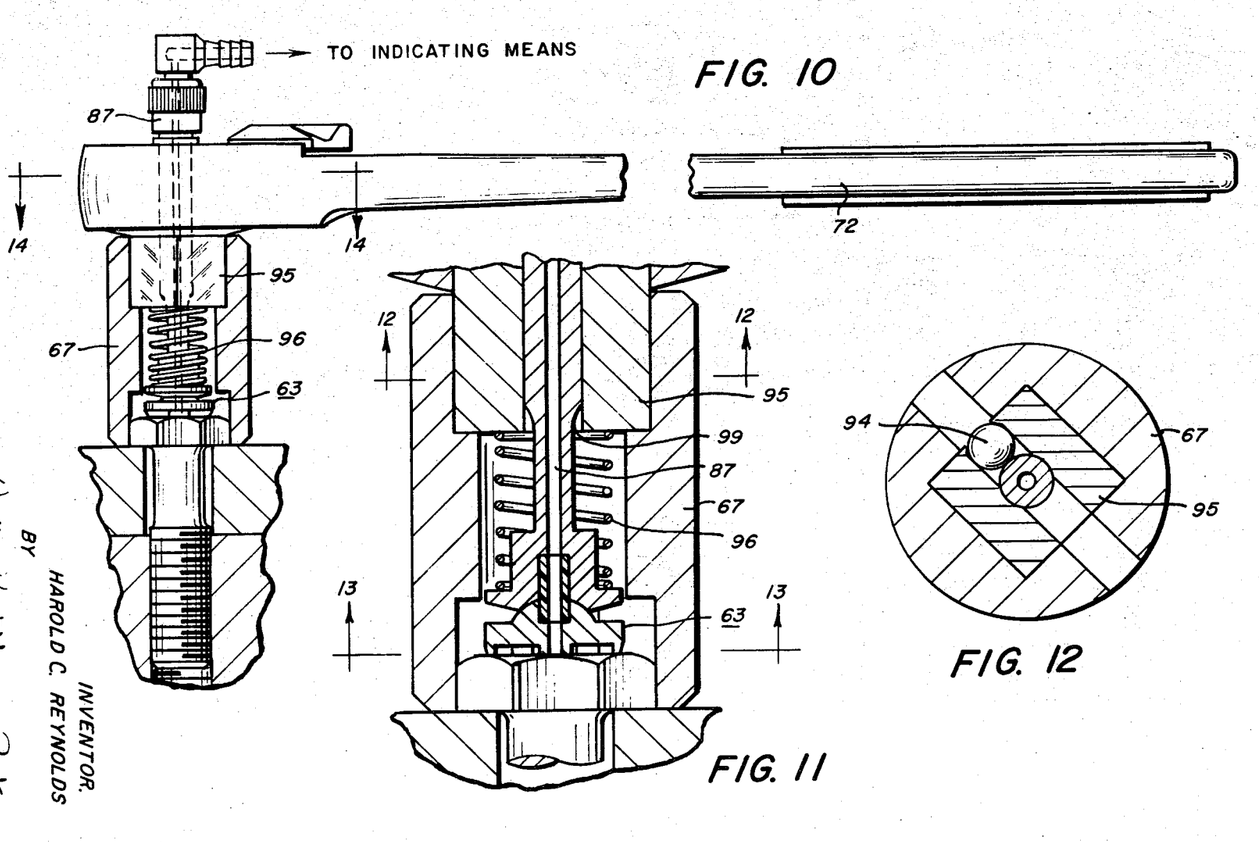
FIG. 10 is an elevational view partially in section showing a hand tool tightening a bolt which tool includes an air measuring head in the socket.
FIG. 11 is an enlarged portion of FIG. 10.
FIG. 12 is a view taken generally along the line 12—12 of FIG. 11.
Figure 13:
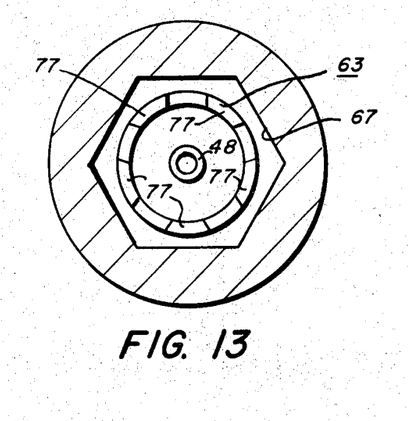
FIG. 13 is a view taken generally along the line 13—13 of FIG. 11.

FIGS. 10 through 14 illustrate the combination of a measuring head 63 of slightly different form than head 53 of FIGS. 6 and 7 in combination with a hand wrench having a socket 67 rotatable by a handle 72 through the means of a conventional ratchet mechanism 73. The head 63 has five pads 77 shown in FIG. 13, for engagement with the peripheral surface of the head of the fastener and a central wall 48 with an air opening is located adjacent the central surface of the fastener head. The head 63 is connected to the air conduit 87 as shown in FIG. 11. The socket 67 is driven by means of a generally square shank 95 which fits in a corresponding opening in the socket as shown in FIG. 12. The air conduit is held in extended position by a spring 96. A ball detent 94 holds the socket 67 on the shank and retraction of the conduit 87 against the urging of spring 96 brings a reduced portion 99 of conduit 87 into alignment with detent 94 which permits the detent to move toward the centerline of the socket and permits removal of the socket. The air conduit 87 is adapted to be connected to a system as shown in FIGS. 6 and 7 so that the tension in the fastener can be read or recorded.

Figure 18:
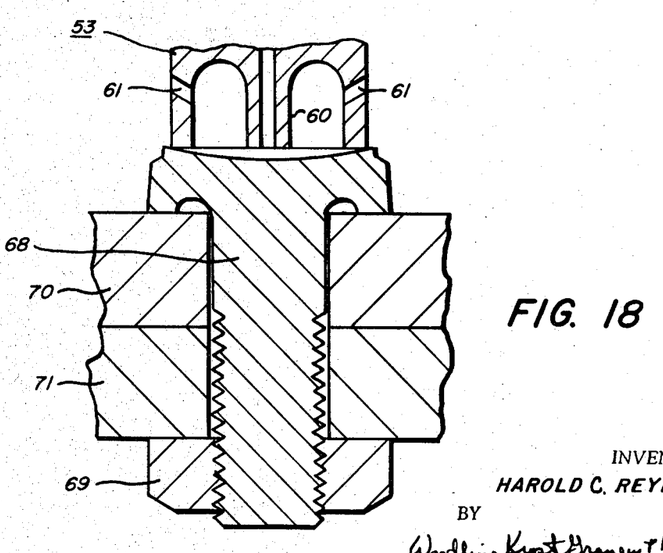
FIG. 18 is a view showing a bolt holding two metal members together by means of a nut fastened to its threaded end with tension being induced in the bolt and showing that the pneumatic means of measuring is susceptible of measuring the tension in the bolt regardless of how the tension is induced.

FIG. 18 demonstrates the use of a bolt 68 constructed in accordance with the teachings of the present invention, in combination with a nut 69 which is threadably attached to the threaded end of the bolt to hold together two plates 70 and 71. This illustration demonstrates that the means by which the bolt 68 is tentioned is of no particular consequence because the tension therein can be measured in exactly the same way as hereinabove described in conjunction with FIGS. 6 and 7. FIG. 18 shows the bolt 68 in its tensioned condition and the measuring head 53 which is shown in FIGS. 6 and 7 has been shown in position on the head of bolt 68 so as to measure the tension in the bolt in the manner hereinabove described. This same basic theory can be applied to determining the tension in devices such as rivets wherein the tension is not applied in the same manner as in bolts.

Figure 19:
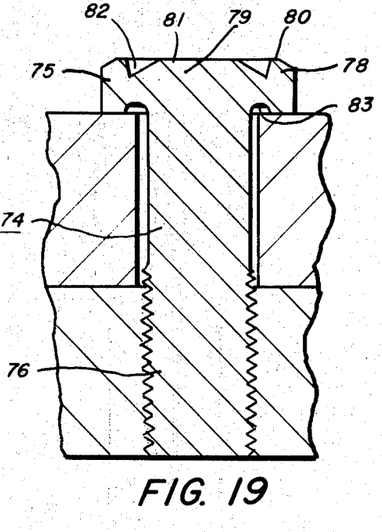
FIGS. 19 and 20 show modified forms of the bolt shown in FIGS. 1 and 2 and which bolts are constructed in accordance with the teachings of the present invention.
Figure 20:
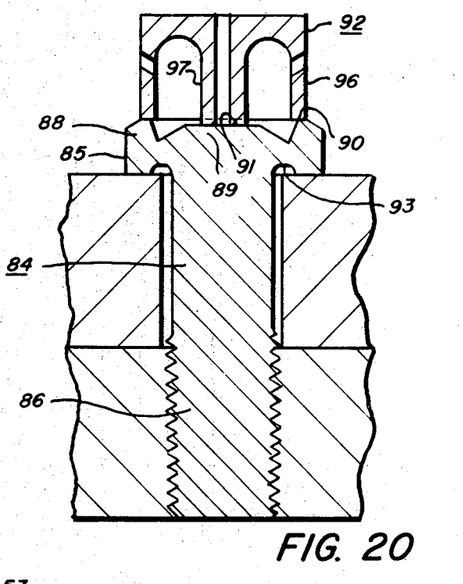

FIGS. 19 and 20 show the teachings of the present invention as applied to bolts 74 and 84 which are of slightly different configurations and in these instances the differences are exhibited only in the head portion thereof. The bolt of FIG. 19 includes a head 75 integrally connected to a threaded shank 76 in the manner of bolt 30. The head of bolt 74 includes an outer peripheral portion 78 and a central portion 79, the two of which are separated from each other by an annular groove 82. The outer peripheral portion 78 is provided with an annular surface 80 and the central portion is provided with a surface 81. There is also provided on the bearing surface of the head 75 a groove 83 which in construction and function is essentially the same as groove 42 in bolt 30. The surfaces 80 and 81 lie in the same plane as do surfaces 38 and 39 on head 32 of bolt 30 and this demonstrates that the surface upon which the reference surfaces lie need not be a continuous surface. The bolt which is shown in FIG. 19 is shown in its untensioned condition, however, in its tensioned condition it would assume essentially the deflected shape as seen in FIG. 2 of the drawings. The tension in this bolt is measured the same way as described in discussing FIGS. 6 and 7. FIG. 20 shows a bolt 84 which includes a head 85 integrally connected to a threaded shank 86 and the head 85 includes an outer peripheral portion 88 and a central portion 89 and these two portions are provided respectively with surfaces 90 and 91. The bearing surface of the head 85 is provided with a groove 93 which is similar in construction and function as groove 83 in bolt 74 of FIG. 19. The essential difference in this particular construction has to do with the relationship of surfaces 90 and 91 with respect to each other particularly in the untensioned condition of the bolt which is the condition shown in FIG. 20. It will be seen that the surface 91 on the central portion 89 is spaced axially in the direction of the threaded shank from the surface 90 on the outer peripheral portion 88. The important thing to note however is that these two surfaces need not lie in the same plane in order that the tension be accurately measured under the teachings of the present invention but it is important that they occupy a predetermined known position with respect to each other. It will be appreciated that the measuring head, such as that disclosed in FIGS. 6 and 7 of the drawings, must be constructed in a slightly different manner to accommodate this difference in shape in bolt 84, but the measuring head will still sense the deflection as the surfaces move with respect to each other so as to regulate the flow of gas under pressure through the valve. A measuring head 92 is shown which has an annular wall 96 which engages surface 90 and a central wall 97 which engages surface 91. The only difference from head 53 is that the central wall 97 is longer but the measuring means functions in the same way.

Figure 21:
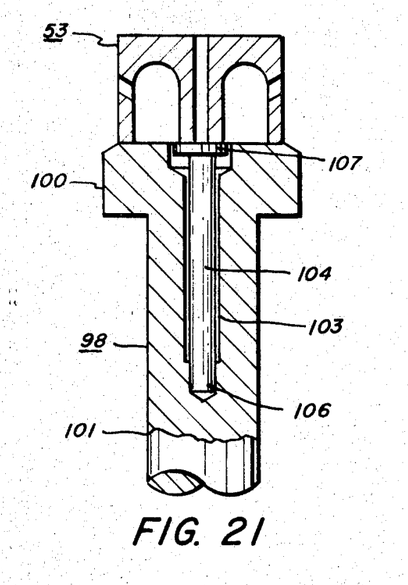
FIG. 21 is an elevational view of a bolt constructed in accordance with the teachings of the prior art and being in an untensioned condition, in combination with the pneumatc measuring means of the present invention which is shown in FIGS. 6 and 7.
Figure 22:
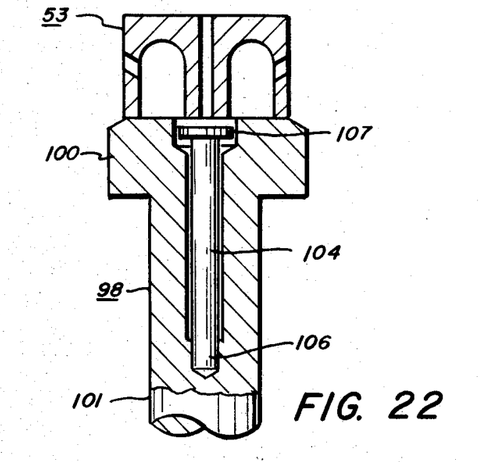
FIG. 22 is a view similar to FIG. 21 but showing the bolt as being in a tensioned condition and showing the measuring means of FIGS. 6 and 7.

FIGS. 21 and 22 show a bolt as constructed in accordance with the teachings of the prior art and with the measuring head 53 of this invention for measuring the tension. This particular bolt has been identified by the bolt has been identified by the reference numeral 98 and includes a head 100 connected to a shank 101. An axial opening 103 is provided which extends through the head 100 into the shank 101. A pin 104 which has first and second end portions 106 and 107 respectively is located in the axial opening 103. The first end portion 106 of the pin 104 is fastened in the bottom of the axial opening 103 as by a press fit or other suitable means and the upper surface of the second end portion 107 is flush with the upper surface of the head 100 in the untensioned condition of the bolt as shown in FIG. 21.

As tension is applied to the bolt 98 as shown in FIG. 22 by a suitable means, the shank 101 of the bolt tends to elongate, however, the pin 104 which has no load thereon does not elongate but travels with the shank thereby causing the end surface of the second end portion 107 to move downwardly into the opening at least with respect to the upper surface of the head 10. It is the differential position of these two surfaces that is measured by the pneumatic means which include the head 53 which is the only portion of the pneumatic measuring means which has been shown in FIGS. 21 and 22. This shows and demonstrates the versatility of the pneumatic measuring means which has been disclosed herein in measuring the tension in a prior art bolt as distinguished from the bolt of the present invention which has been shown particularly in FIGS. 1 and 2.

Figures 23, 24, 27:
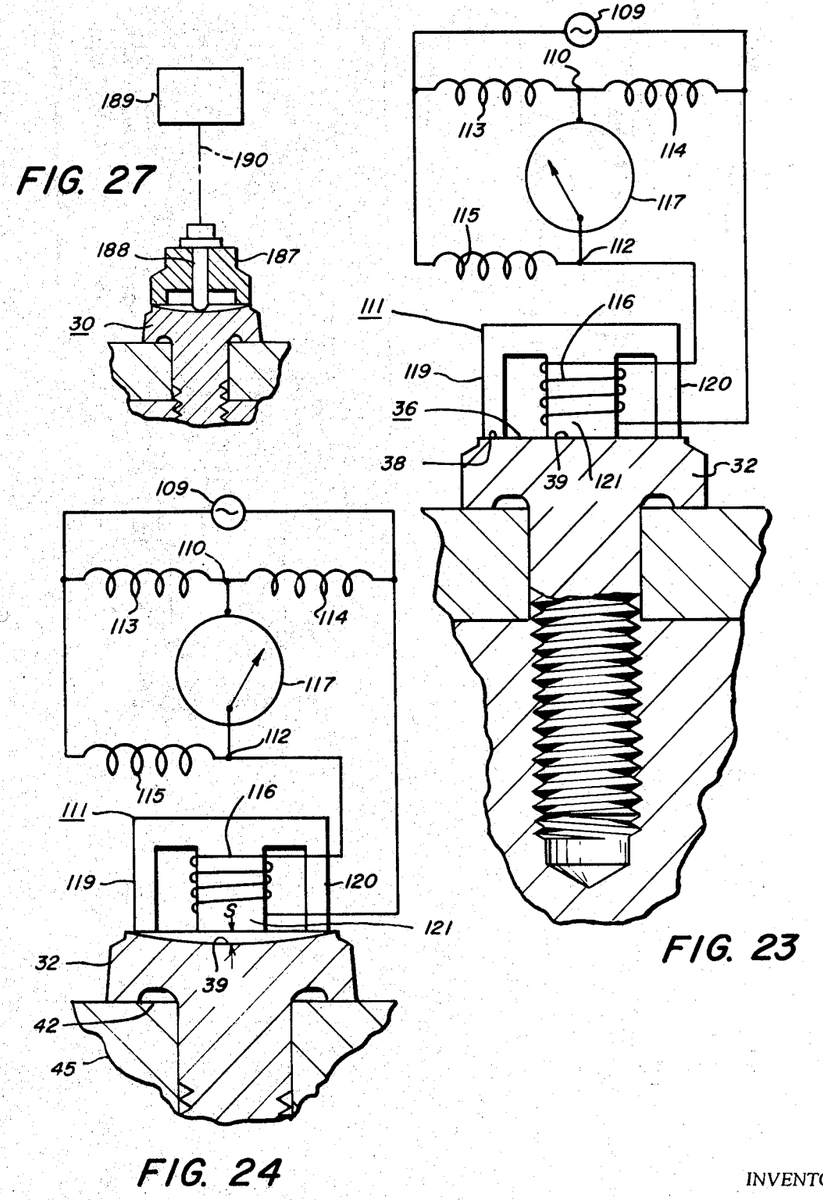
FIGS. 23 and 24 show electrical-magnetic means of measuring the tension in the bolt with FIG. 23 showing the bolt in an untensioned condition and FIG. 24 showing the bolt in a tensioned condition.
FIG. 27 is a view showing a bolt in combination with a measuring head of different construction operably connected to a transducer.

FIGS. 23 and 24 show an electro-magnetic apparatus for measuring the tension in the bolt of the present invention shown in FIGS. 1 and 2. This apparatus includes an alternating current power source 109 which is connected to a Wheatstone bridge circuit. The apparatus includes a magnetic core 111 which comprises first and second outer leg portions 119 and 120 respectively and an intermediate or central leg 121. The first and second leg portions are adapted to engage the top surface 36 of the head at the outer peripheral surface 38 and the intermediate leg 121 is adapted to engage the central surface 39. In the untensioned condition of the bolt, which is shown in FIG. 23, the first and second leg portions and the intermediate leg all engage the top surface of the bolt. Three legs of the Wheatstone bridge surface include inductances 113, 114 and 115 whereas the fourth leg of the circuit comprises a coil 116 which is wound about the central leg 121 and this coil induces magnetic flux in the magnetic core 111 which magnetic flux resists flow of current through this fourth leg of the circuit and the resistance to electrical flow is greatest when the magnetic flux flow in the magnetic circuit is at its highest value. It will therefore be seen when viewing FIG. 24, that as the bolt is tensioned, and deflection occurs, moving the central surface 39 away from the central leg 121 causing an air gap (increasing the reluctance of the magnetic circuit), that the magnetic intensity in the core decreases, therefore, reducing the back EMF or the resistance to current flow thereby reducing the inductance of the fourth leg. A voltmeter 117 is connected across the legs of the Wheatstone bridge circuit and this voltmeter is calibrated to record changes in voltage across the points 110, 112, which changes in voltage are a function of the air gap created between the central leg 121 and the central surface 39, upon tensioning of the bolt. Since the air gap S or the deflection is related to the tension in the threaded member (see FIG. 16), then by the same token the tension in the threaded member bears a relationship to the voltage recorded on the voltmeter 117 and a curve can be constructed showing the air gap S on one axis against voltage on the other axis so that tension can be determined. It is therefore possible to calibrate the voltmeter 117 so as to read directly in tension in the threaded member so that this value can be read directly off the meter 117.

Figure 25:
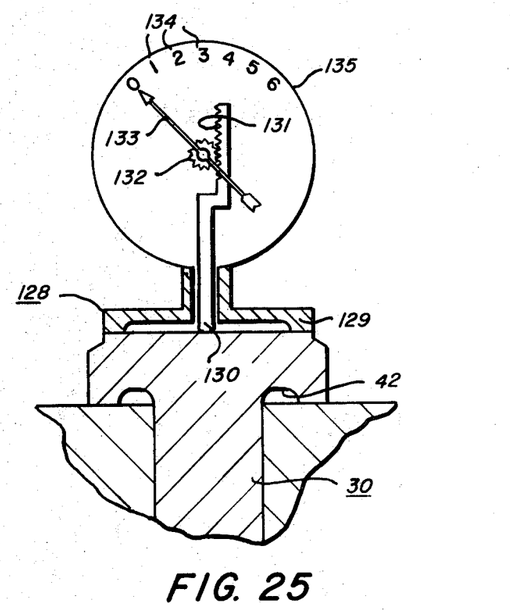
FIGS. 25 and 26 illustrate a mechanical means of measuring the tension in the threaded member with FIG. 25 showing the bolt in an untensioned condition and FIG. 26 showing the bolt in a tensioned condition.
Figure 26:
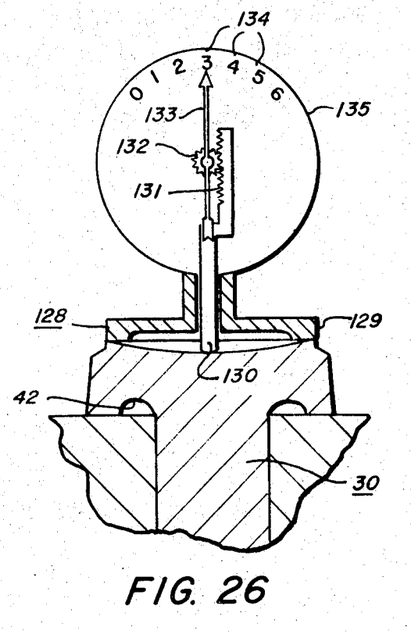

FIGS. 25 and 26 show a mechanical means for measuring the deflection in the bolt shown in FIGS. 1 and 2. This mechanism includes a head 128 which is adapted to engage the top surface of the head of the bolt and this head includes an annular wall 129 and a central leg 130. The central leg 130 extends through an opening in the head and has rack gear teeth 131 on an end thereof. The annular wall engages the peripheral surface of the fastener head through 360 degrees, however, it might have only a three point contact as discussed in connection with head 53. A shaft 132 is provided which has pinion teeth which mesh with teeth 131 which rotates the shaft upon longitudinal movement of leg 130. The shaft 132 carries a pointer 133 which cooperates with indicia 134 on a scale 135. The indicia is calibrated in terms of tension in the fastener. FIG. 25 shows the fastener in its untensioned condition with the pointer 133 indicating no tension. FIG. 26 shows the fastener tensioned with the head deflected and in such case the central leg 130 follows the deflection with rotation of the shaft 132 and an indication of the tension by pointer 133. This device as well as the other measuring means can be utilized to recheck the tension in fasteners at any stage of their use as well as when they are originally installed.

Figure 28:
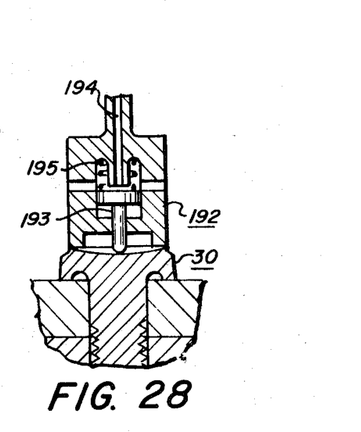
FIG. 28 is a view showing the deflection of the head of a bolt opening a fluid value upon tensioning of the bolt.
Figure 29:
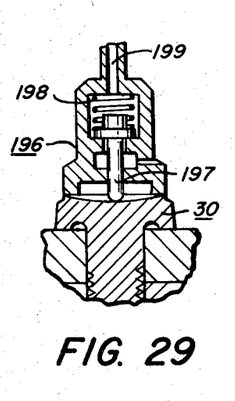
FIG. 29 is a view similar to FIG. 28 showing the deflection of the head of a bolt closing a fluid value upon tensioning of the bolt.

FIGS. 27, 28 and 29 illustrate that the deflection of the head of the fastener can be reflected to other mechanism in many ways to accomplish the intended results. FIG. 27 shows the fastener 30 in its tensioned condition of FIG. 2 with a slightly different means of detecting the deflection. In this respect, a measuring head 187 has been shown which supports a pin member 188 in the manner shown and it will be seen that one end of the pin member follows the central portion of the top surface of the head as it deflects and the other or upper end of the pin member is operably connected to a transducer 189 by means of the dot-dash connection 190. The transducer may be one of many devices, for example, a fluid, electrical, optical or acoustical apparatus. The transducer performs the function of detecting the amount of deflection in the fastener and measuring it by one of the aforementioned devices.

FIGS. 28 and 29 are examples of devices similar to that specifically shown in FIGS. 6 and 7, however, in these devices the valving action occurs at a place removed from the top surface of the head of the fastener. FIG. 28 shows the opening of a fluid valve upon tensioning of the member in a manner similar to that shown in FIGS. 6 and 7 and FIG. 29 shows the closing of a fluid valve upon tensioning of the fastener.

FIG. 28 shows a measuring head 192 which is adapted to cooperate with a fastener 30 and this head 192 serves to support a pin member 193, the lower end of which follows the deflecting surface of the head of the fastener and the upper end of the pin member acts as a valve which is normally closed when there is no tension in the fastener and opens as the fastener is tensioned to permit flow of fluid through passage 194. A spring 195 keeps the pin member in contact with the fastener. In FIG. 29 the measuring head has been identified by the reference numeral 196 and serves to mount a pin member 197 as shown, the lower end of which is biased by means of a spring 198 into constant engagement with the top surface of the head of fastener 30. It will be apparent in this construction that in the untensioned condition of the fastener, the valve (upper end of pin member 197) is in an open position permitting passage of fluid through the passage 199 and as the fastener is tensioned, the valve serves to close off fluid flow through passage 199. Flow through the devices of FIGS. 28 and 29 can be appropriately measured and calibrated as a function of the deflection in the head of the threaded member which is a function of the tension in the threaded member.

Figure 30:
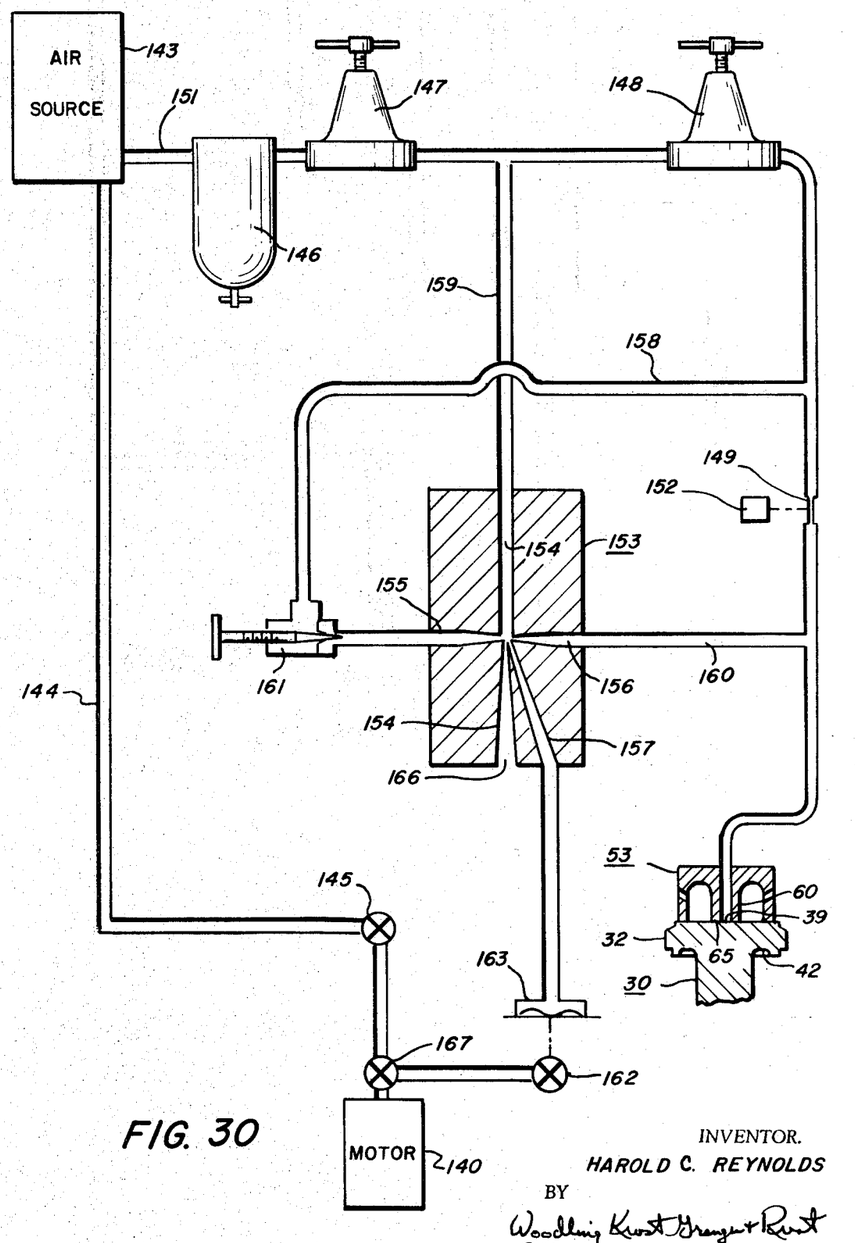
FIG. 30 is a schematic view showing a measuring means similar to FIGS. 6 and 7 in combination with a fluidic control circuit for shutting off a pneumatic air tool when a predetermined amount of tension has been applied to the threaded member.
Figures 33, 35:
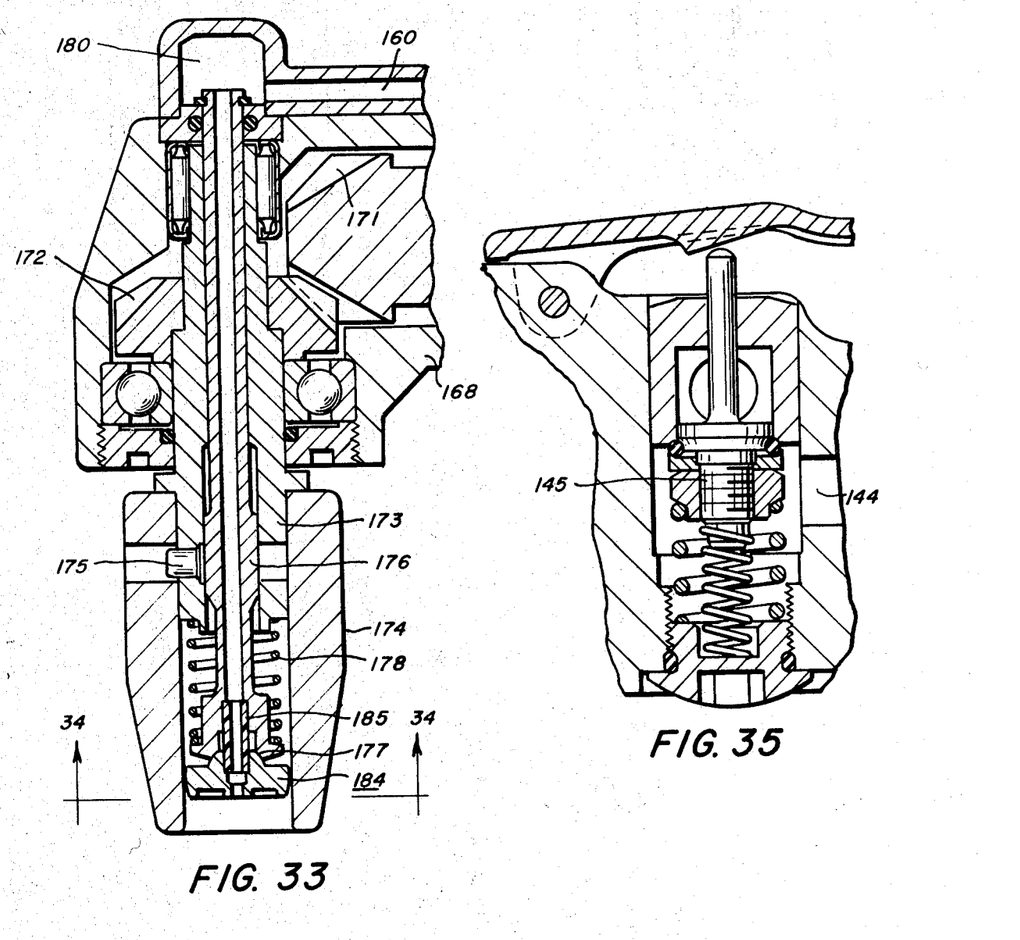
FIG. 33 is an enlarged elevational view of the socket shown in FIG. 31.
FIG. 35 is a view of the hand valve shown in FIG. 31 taken approximately 90 degrees from the view of FIG. 31.
Figure 34:
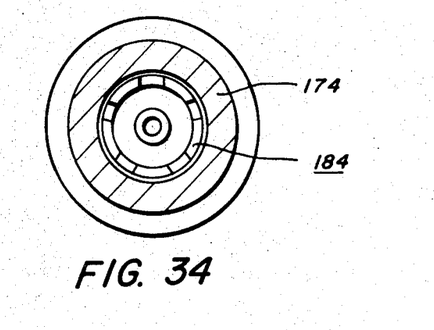
FIG. 34 is a view taken generally along the line 34—34 of FIG. 33.

FIG. 30 is a schematic showing of a control circuit whereby the rotation of an air motor 140 is controlled as a function of the tension in a bolt 30 which is being turned down by the air motor 140. In this circuit an air pressure source 143 has been shown and air is directed to the air motor from the source 143 through a conduit 144 by way of a hand valve 145. Air under pressure is fed from the source 143 through a conduit 151 to a filter 146 and regulator 147 which reduces the pressure down to some desired operable pressure, for example 5 pounds per square inch. After this, the air passes through another regulator 148 where it is reduced to a still lower pressure, for example 1½ pounds per square inch, and this air under pressure thereafter passes through a fixed orifice 149 which has an adjusting means 152 to a measuring head 53. This portion of the pneumatic circuit through conduit 151 is essentially the same circuitry that has been shown in FIGS. 6 and 7 hereinabove. A fluidic control mechanism identified generally by the reference numeral 153 is provided and in accordance with a signal, will serve to direct air pressure in a desired direction to accomplish a desired function. This particular control mechanism is known in the trade as a Schmitt Trigger. The Schmitt Trigger 153 which has been shown includes what will be identified as a through pressure passage 154, a bias pressure passage 155, a control pressure passage 156, and a work pressure passage 157. Air under pressure on the downstream side of regulator 147 and the upstream side of regulator 148 is fed through conduit 159 to the through pressure passage 154 of the fluidic control mechanism. Air under pressure on the downstream side of regulator 148 and on the upstream side of the fixed orifice 149 is fed through conduit 158 by way of a needle valve 161 into the bias pressure passage 155. Air under pressure from the downstream side of the fixed orifice 149 is fed by way of conduit 160 into the control pressure passage 156. The bias pressure which is introduced into bias pressure passage 155 can be varied as desired by controlling the needle valve 161. Also included in the circuit is a diaphragm 163 which is connected by way of a fluid conduit to the work pressure passage 157 and this diaphragm acts to control a valve 162 which in turn controls air flow from conduit 144 through a valve 167 and into motor 140. Hand or throttle valve 145 is normally closed and the conduit between valve 145 and valve 167 is vented to atmosphere through 182 (see FIG. 31) and the exhaust of the air motor. Valve 167 is normally open permitting flow to the motor 140 when the hand valve 145 is opened. Valve 162 is normally closed and when opened by means of diaphragm 163, the opening causes valve 167 to close, when valve 145 is open. The structure and operation of these valves will be discussed in more detail in conjunction with FIG. 31.

In the operation of the device and system of FIG. 30, it will first be assumed that the bolt 30 is in its untensioned condition as shown in FIG. 30, and in its untensioned condition it will be clear from the disclosure hereinabove that the head 32 does not permit any air flow through the valve 39, 65 which is formed between the central surface 39 of the head and the surface 65. The valve of course could be as shown in FIG. 27. Under these conditions, air under pressure or what might be referred to as bias pressure, is introduced into the bias pressure passage 155 and by the same token air under pressure is introduced by way of conduit 160 into the control pressure passage 156. These are regulated and designed so that in the untensioned condition of the bolt or the no-flow condition thereof, these two air streams serve to control the air introduced into through pressure passage 154 so that this air flows centrally through the control mechanism 153 and exits to atmosphere through port 166. At the same time the air motor 140 is caused to be actuated by way of air under pressure from the source 143 through conduit 144, hand valve 145 when opened, and normally open valve 167, which turns down or applies tension to the bolt 30.

FIGS. 31 through 35 show the specific means for turning down the bolt 30 by the air motor 140. As understood from above, when the bolt is being tensioned, the central surface 39 on the top surface of the head of the bolt is caused to deflect (see FIG. 7) or permit an increasingly larger gap S or to produce an increasingly larger valve opening which increases the air flow through the head 53. As the air flow increases, the pressure on the downstream side of the orifice 149 drops with a resultant drop in the pressure in control pressure passage 156. This means that the pressure in the bias pressure passage increases relative to the control pressure passage causing the air stream previously passing through the passage 154 to atmosphere through port 166 to be directed through the work pressure passage 157. This causes the diaphragm 163 to be actuated. When the diaphragn 163 is actuated, this causes valve 162 to be opened with subsequent closing of valve 167 which shuts off the air to the motor 140. It will be appreciated that the valve 167 might be located in either the air entrance side of the air motor or the air exit side of the air motor to accomplish the function of shutting off the motor. It will therefore be apparent that depending upon the tension which is desired in the bolt, that appropriate settings can be made so that the air motor 140 shuts off when just the correct amount of tension has been achieved. It will also be appreciated by those skilled in the art that many secondary operations might be initiated other than shutting off the motor for example slowing down or reversing the motor, shifting gears and many other functions too numerous to mention.

The air motor 140 shown schematically in FIG. 30 is shown in detail in FIGS. 31 through 35 and includes a housing 168 within which is located a rotor 169 which drives an output shaft 170 in a conventional manner. The output shaft 170 through gears 171 and 172 drives another shaft 173 which is keyed to gear 172 which in turn drives a socket 174. A fluid control tube 176 extends axially through shaft 173 and one end thereof communicates with a chamber 180 and the other end is in fluid communication with a measuring head 184 which is essentially of the same construction as that shown in FIGS. 10 through 12. A plastic tube 185 best seen in FIG. 33 connects the head 184 to tube 176 and this coupled with mating surfaces 177 permits universal movement of head 184 to accommodate inaccuracies in alignment between the head of a bolt and socket 174. A spring 178 keeps control tube 176 extended. An axial push on head 184 against spring 178 permits a pin 175 to retract into a recessed portion of tube 176 and permits the socket 174 to be removed. As discussed in connection with FIG. 30, air enters the motor from conduit 144, through hand valve 145 when opened, through normally open valve 167 to the rotor 169. When air passes through valve 167 air bleeds through opening 179 to chamber 180 which contains a biasing spring 181 and air also bleeds through an opening 182 at the other end of the valve. The balance of the pressures and spring force acting on valve 167 is such that it is kept open. When the signal from the control mechanism 153 (see FIG. 30) through passage 157 actuates diaphragm 163 it causes valve 162 to be opened suddenly venting chamber 180 to atmosphere causing air pressure on the other end of valve 167 to rapidly close the same and stop the motor. Line pressure from 144 continues to hold the valve 167 closed until the hand valve 145 is closed at which time spring 181 opens valve 167 since the passage downstream from valve 145 is ported to atmosphere through open valve 167 and rotor 169. Valve 162 is closed when diaphragm 163 is deactuated which is the case when head 53 is placed on another untensioned bolt 30.

Figures 14, 31, 32:
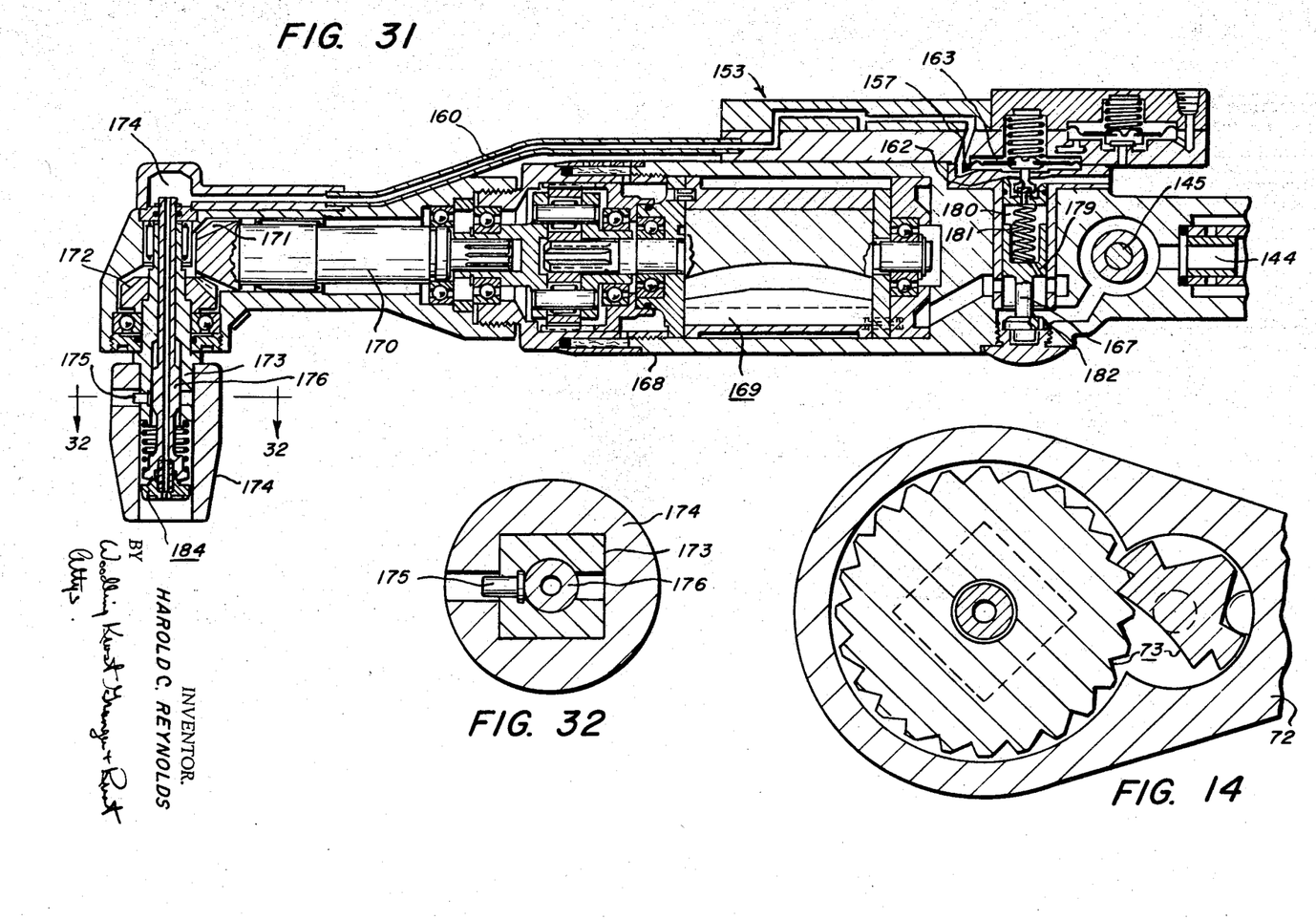
FIG. 14 is a view taken generally along the line 14—14 of FIG. 10.
FIG. 31 is a view of an air tool in section, which can be utilized with the circuit shown in FIG. 30 for tensioning a threaded member.
FIG. 32 is a view taken generally along the line 32—32 of FIG. 31.

FIG. 31 shows many of the components of the control circuit shown only schematically in FIG. 30, however, no attempt has been made to show the precise physical construction of the entire control circuit. It will also be appreciated by those skilled in the art that the control system might very well be electrical or electro-magnetic along the principles described in conjunction with FIGS. 23 and 24 without departing from the spirit of the present invention.

It will thus be seen from the disclosure hereinabove that the objects have been accomplished in that a fastener has been disclosed wherein the tension therein can be quickly and conveniently measured and various mechanisms for measuring the tension have been disclosed. In addition to this, one example of initiating a secondary operation as a function of the tension in a fastener has been disclosed. The entire disclosure contributes a precision to the fastener industry that has not heretofore been possible.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A method of measuring tension in a fastener having a head and shank with the head having integrally formed first and second external reference surfaces with said first reference surface positioned on the axis of said shank and said second reference surface positioned radially outwardly therefrom, said method comprising the steps of placing a detecting apparatus in sensing position with respect to said reference surfaces, applying forces to said fastener to change the tension thereof, and during the application of said forces simultaneously measuring tension changes by detecting the change in relative position of said reference surfaces in the direction of said axis.

2. A method of measuring and indicating the increase in tension in a threaded fastener being tightened by the application of torque thereto, said fastener having a head at one end of a threaded shank with said head having integrally formed first and second external reference surfaces with said first reference surface positioned on the axis of said shank and said second reference surface positioned radially outwardly therefrom, said method comprising the steps of establishing the initial relative position of said reference surfaces along said axis when there is zero tension on said fastener, placing a detecting apparatus in sensing position with respect to said reference surfaces, applying torque to said fastener to change the tension thereof, simultaneously detecting the change in relative position from said initial relative position of said reference surfaces in the direction of said axis while such torque is applied to said fastener and converting such detecting change in relative position to an indication of increase in tension from zero tension.

3. A method of measuring tension in a fastener having a head and a shank with the head having a top, integrally formed external surface extending across the axis of said fastener shank, said method comprising the steps of placing a detecting apparatus in sensing position with respect to said external surface and measuring fastener tension by measuring the change in relative position along the axis of said shank between a first portion of said external surface on said axis and a second portion of said external surface spaced radially from said axis.

4. A method of measuring tension in a threaded fastener having an integrally formed exposed head surface extending across the axis of the shank thereof comprising the steps of placing a detecting apparatus in sensing position with respect to said surface, applying torque to said fastener to change the tension thereof, and during the application of said torque simultaneously measuring said tension changes by detecting the deflection of said head surface in a direction parallel to the axis of said shank.

5. A method of measuring tension in a fastener having a shank and an exposed integrally formed head surface extending across the axis of said shank which head surface has undergone a predetermined deflection in the direction of the axis of said shank from a position of zero deflection in response to the application of a predetermined tension on said fastener, said method comprising the steps of placing a deflection detecting apparatus in sensing position with respect to said exposed head surface, detecting the actual deflection in the direction of the axis of said shank from said zero position, and comparing said detected deflection to said predetermined deflection to determine if said fastener remains under said predetermined tension.

6. A method of measuring tension in a bolt having a shank and a generally flat, integrally formed external head surface extending across the axis of said shank comprising the steps of measuring the relative deflection in the direction of the axis of said shank between a first portion of said external head surface on said axis and a second portion radially away from said axis caused by tension upon said fastener.

7. A method of measuring tension in a bolt having an exposed, integrally formed flat head surface comprising the steps of placing a deflection sensing apparatus upon said flat head, applying a tightening torque to said bolt to increase tension therein, and simultaneously measuring the deflection of said flat head surface in the direction of the axis of the shank of said bolt.

8. A method of measuring tension in a bolt having an exposed, integrally formed head surface extending across the axis of the shank of said bolt comprising the steps of (1) placing a fluid metering device upon said exposed head surface such that the area of fluid passage between said metering device and said head surface will vary in proportion to the deflection of said head surface in the direction of the axis of said shank, (2) supplying fluid under pressure to said fluid metering device, (3) measuring fluid flow through said fluid metering device to calculate deflection of said head surface in the direction of the axis of said shank due to tension on said bolt.

9. A method of measuring tension in a bolt having an exposed, integrally formed head surface extending across the axis of the shank of said bolt comprising the steps of (1) placing an electrical reactance device upon said exposed head surface such that the measured reactance of said reactance device will vary in proportion to the deflection of said head surface in the direction of the axis of said shank, and (2) measuring the electrical reactance of said reactance device to calculate deflection of said head surface in the direction of the axis of said shank due to tension on said bolt.

References Cited

UNITED STATES PATENTS

| 2,543,705 | 2/1951 | Place | 73—88(F) |
| 2,889,729 | 6/1959 | Orner | 73—88(F) |

JERRY W. MYRACLE, Primary Examiner

U.S. Cl. X.R.

85—62

PO-1050
(5/69)

UNITED STATES PATENT OFFICE
CERTIFICATE OF CORRECTION

Patent No. 3,561,260          Dated February 9, 1971

Inventor(s) Harold C. Reynolds

It is certified that error appears in the above-identified patent and that said Letters Patent are hereby corrected as shown below:

Column 2, line 23, the word "drawing" should be drawings.

Column 2, line 38, the spelling of the word "still" should be corrected.

Column 4, line 49, the word "he" should be the.

Column 4, line 54, the word "his" should be this.

Column 7, line 67, delete the words "bolt has been identified by the".

Column 8, line 9, the number "1Q" should be 100.

Column 8, line 11, after the word "pneumatic", add the word measuring.

Signed and sealed this 8th day of June 1971.

(SEAL)
Attest:

EDWARD M. FLETCHER, JR.        WILLIAM E. SCHUYLER, J
Attesting Officer                  Commissioner of Patent